US010976193B1

(12) United States Patent
Juan et al.

(10) Patent No.: US 10,976,193 B1
(45) Date of Patent: Apr. 13, 2021

(54) DISPLAY DEVICE AND METHOD FOR CONTROLLING OPTICAL SENSING UNIT COMPRISING A CONTROLLED DRIVING UNIT FOR DRIVING THE OPTICAL SENSING UNIT TO MOVE WITH RESPECT TO A DISPLAY UNIT

(71) Applicant: QISDA CORPORATION, Taoyuan (TW)

(72) Inventors: Fei-Ming Juan, Yunlin County (TW); Tse-Wei Fan, Taoyuan (TW)

(73) Assignee: QISDA CORPORATION, Taoyuan (TW)

( * ) Notice: Subject to any disclaimer, the term of this patent is extended or adjusted under 35 U.S.C. 154(b) by 40 days.

(21) Appl. No.: 16/593,937

(22) Filed: Oct. 4, 2019

(30) Foreign Application Priority Data

Sep. 20, 2019 (CN) .......................... 201910892496.0

(51) Int. Cl.
| | |
|---|---|
| *G01J 3/50* | (2006.01) |
| *G01J 1/04* | (2006.01) |
| *G01J 1/02* | (2006.01) |
| *G01J 1/42* | (2006.01) |
| *H02K 37/00* | (2006.01) |

(52) U.S. Cl.
CPC .......... *G01J 1/0403* (2013.01); *G01J 1/0228* (2013.01); *G01J 1/4204* (2013.01); *H02K 37/00* (2013.01)

(58) Field of Classification Search
CPC ............ G09G 5/10; G09G 2320/0233; G09G 2320/0626; G09G 2320/0693; G06F 3/1423; G02B 2027/0118; G01J 3/46; G01J 3/462; G01J 3/524; G01J 3/506; H04N 5/57
USPC ........................ 250/214 R, 214.1, 208.1, 221
See application file for complete search history.

(56) References Cited

U.S. PATENT DOCUMENTS 9,753,518 B2 * 9/2017 Zhou ........................ G06F 1/163

\* cited by examiner

*Primary Examiner* — Que Tan Le
(74) *Attorney, Agent, or Firm* — Winston Hsu (57) ABSTRACT

A display device includes a casing, a display unit, an optical sensing unit, a driving unit and a processing unit. The processing unit controls the display unit to display a predetermined pattern corresponding to a predetermined range. The predetermined pattern includes a target area. The target area is adjacent to a target position and corresponds to a driving parameter of the driving unit. When the optical sensing unit is located within the target area, the driving unit drives the optical sensing unit to move to the target position by a predetermined manner. When the optical sensing unit is located beyond the target area, the driving unit drives the optical sensing unit to move towards the target position. When the optical sensing unit moves to a boundary of the target area, the driving unit drives the optical sensing unit to move to the target position by the driving parameter.

13 Claims, 7 Drawing Sheets

DISPLAY DEVICE AND METHOD FOR CONTROLLING OPTICAL SENSING UNIT COMPRISING A CONTROLLED DRIVING UNIT FOR DRIVING THE OPTICAL SENSING UNIT TO MOVE WITH RESPECT TO A DISPLAY UNIT

BACKGROUND OF THE INVENTION

1. Field of the Invention

The invention relates to a display device and, more particularly, to a display device equipped with an optical sensing unit and a method for controlling the optical sensing unit.

2. Description of the Prior Art

At present, some display devices are equipped with an optical sensor for measuring brightness and/or color displayed by the display device. The optical sensor is usually disposed in a front bezel of the display device and a motor is configured to drive the optical sensor to move. When the display device is powered off during the movement of the optical sensor, the optical sensor will stop at a specific position. When the display device is powered on next time, it needs to control the motor to drive the optical sensor to go back to an origin point first. The prior art utilizes a brightness sensor to sense whether the optical sensor has gone back to the origin point. However, the brightness sensor will increase the cost of the display device. If there is no brightness sensor, the lifespan of the motor may reduce due to over-rotation.

SUMMARY OF THE INVENTION

An objective of the invention is to provide a display device equipped with an optical sensing unit and a method for controlling the optical sensing unit. The invention can reduce a degree of over-rotation for a driving unit, so as to extend the lifespan of the driving unit effectively.

According to an embodiment of the invention, a display device comprises a casing, a display unit, an optical sensing unit, a driving unit and a processing unit. The display unit is disposed in the casing. The optical sensing unit is movably connected to the casing. The driving unit is connected to the optical sensing unit. The driving unit drives the optical sensing unit to move with respect to the display unit within a predetermined range. The processing unit is electrically connected to the display unit, the optical sensing unit and the driving unit. The processing unit controls the display unit to display a predetermined pattern corresponding to the predetermined range. A region where the predetermined pattern is located at is divided into a plurality of areas. The predetermined pattern within the areas has different optical characteristics and the areas comprise a target area. The target area is adjacent to a target position. The target area corresponds to a driving parameter of the driving unit. The optical sensing unit is located within one of the areas and senses the optical characteristic of the one of the areas correspondingly. The processing unit determines whether the optical sensing unit is located within the target area according to a sensing result of the optical sensing unit. When the processing unit determines that the optical sensing unit is located within the target area, the processing unit controls the driving unit to drive the optical sensing unit to move to the target position by a predetermined manner. When the processing unit determines that the optical sensing unit is located beyond the target area, the processing unit controls the driving unit to drive the optical sensing unit to move towards the target position. When the processing unit determines that the optical sensing unit moves to a boundary of the target area, the processing unit controls the driving unit to drive the optical sensing unit to move to the target position by the driving parameter corresponding to the target area.

According to another embodiment of the invention, a method for controlling an optical sensing unit is adapted to a display device. The display device comprises a display unit, a driving unit and the optical sensing unit. The driving unit drives the optical sensing unit to move with respect to the display unit within a predetermined range. The method comprising steps of controlling the display unit to display a predetermined pattern corresponding to the predetermined range, wherein a region where the predetermined pattern is located at is divided into a plurality of areas, the predetermined pattern within the areas has different optical characteristics and the areas comprise a target area, the target area is adjacent to a target position, and the target area corresponds to a driving parameter of the driving unit; sensing the optical characteristic of one of the areas by the optical sensing unit; determining whether the optical sensing unit is located within the target area according to a sensing result of the optical sensing unit; when the optical sensing unit is located within the target area, controlling the driving unit to drive the optical sensing unit to move to the target position by a predetermined manner; when the optical sensing unit is located beyond the target area, controlling the driving unit to drive the optical sensing unit to move towards the target position; and when the optical sensing unit moves to a boundary of the target area, controlling the driving unit to drive the optical sensing unit to move to the target position by the driving parameter corresponding to the target area.

As mentioned in the above, when the display device is powered on, the invention controls the display unit to display the predetermined pattern with different optical characteristics. Then, the invention determines whether the optical sensing unit is located within the target area adjacent to the target position according to the sensing result of the optical sensing unit, so as to determine how to control the driving unit to drive the optical sensing unit to move to the target position. Accordingly, the invention can reduce a degree of over-rotation for the driving unit, so as to extend the lifespan of the driving unit effectively. Furthermore, the invention does not need to install the brightness sensor of the prior art configured to sense the position of the optical sensor, such that the cost of the display device can be reduced effectively.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
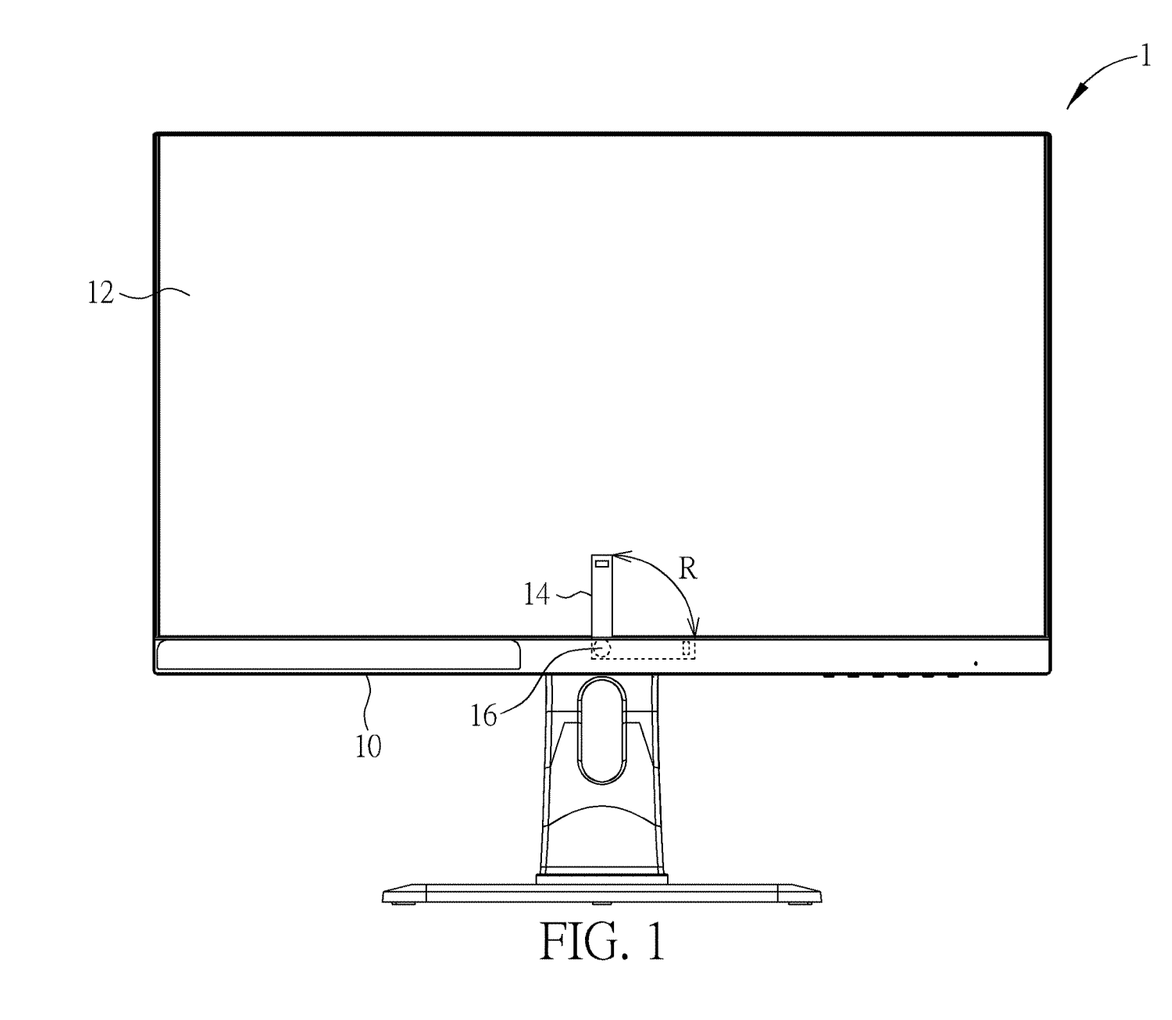
FIG. 1 is a schematic view illustrating a display device according to an embodiment of the invention.
Figure 2:
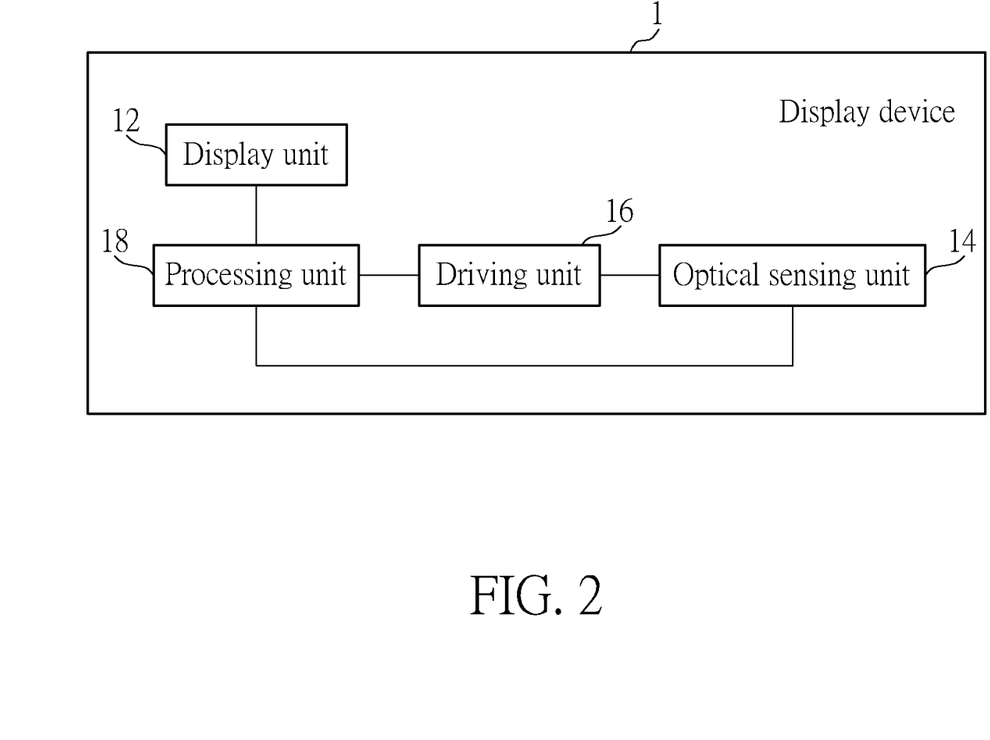
FIG. 2 is a functional block diagram illustrating the display device shown in FIG. 1.
Figure 3:
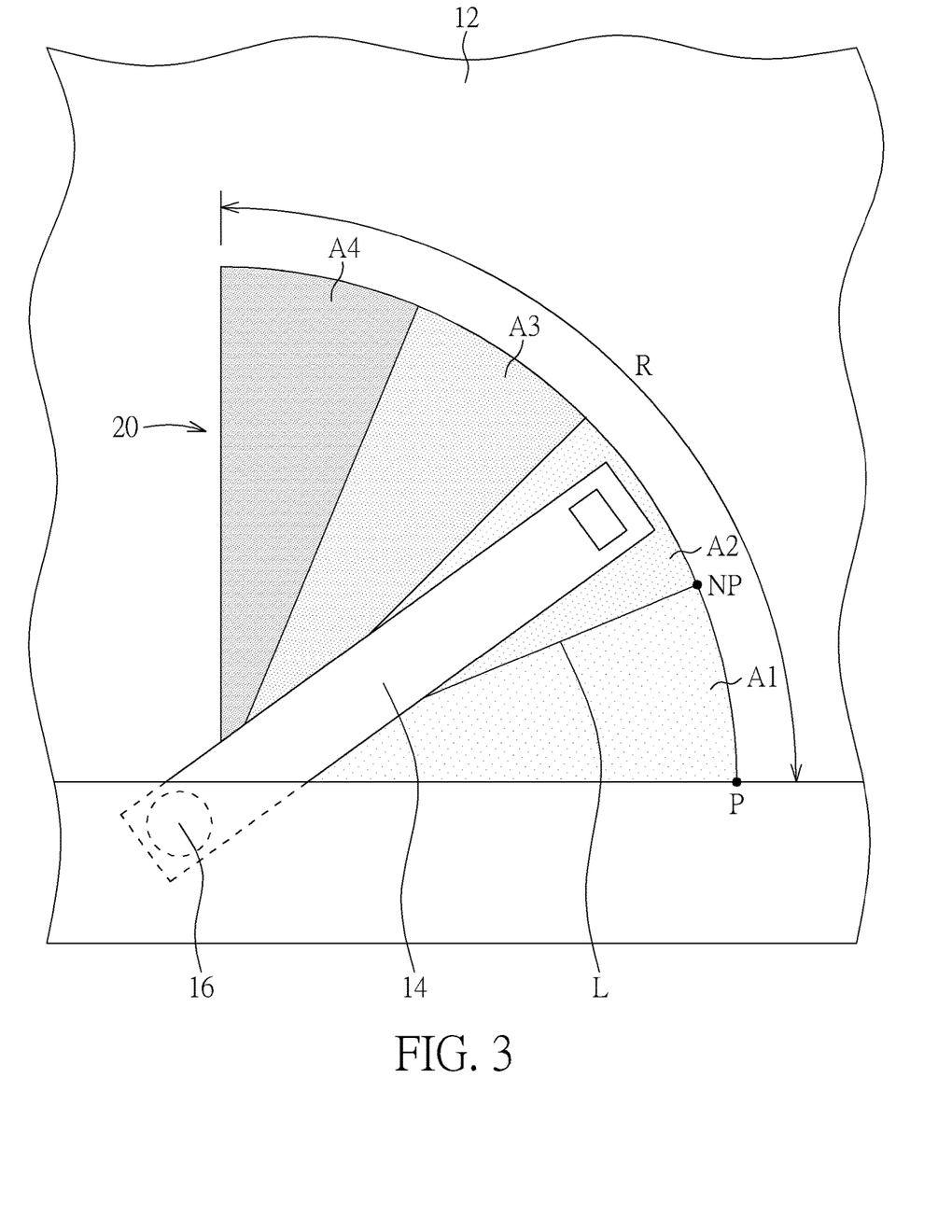
FIG. 3 is a schematic view illustrating an optical sensing unit located beyond a target area.

Referring to FIGS. 1 to 3, FIG. 1 is a schematic view illustrating a display device 1 according to an embodiment of the invention, FIG. 2 is a functional block diagram illustrating the display device 1 shown in FIG. 1, and FIG. 3 is a schematic view illustrating an optical sensing unit 14 located beyond a target area A1.

As shown in FIGS. 1 and 2, the display device 1 comprises a casing 10, a display unit 12, an optical sensing unit 14, a driving unit 16 and a processing unit 18, wherein the processing unit 18 is electrically connected to the display unit 12, the optical sensing unit 14 and the driving unit 16. In this embodiment, the display unit 12 may be a display panel, the optical sensing unit 14 may be a brightness sensor, a color sensor, an image sensor or an optical sensor, and the processing unit 18 may be a processor or a controller with signal processing function. In general, the display device 1 may be further equipped with some necessary hardware or software components for specific purposes, such as a memory, an input/output port, applications, a circuit board, a power supply, etc., and it depends on practical applications.

The display unit 12 is disposed in the casing 10. Specifically, the casing 10 fixes a periphery of the display unit 12 and covers a back side of the display unit 12, and a front side of the display unit 12 is exposed from the casing 10 to display images. The optical sensing unit 14 is movably connected to the casing 10. In other words, the optical sensing unit 14 is connected to the casing 10 and the optical sensing unit 14 can move with respect to the casing 10. The driving unit 16 is connected to the optical sensing unit 14. The driving unit 16 is configured to drive the optical sensing unit 14 to move with respect to the display unit 12 within a predetermined range R, wherein one side of the predetermined range R may be defined as an edge where a target position P is located at. In this embodiment, the target position P does not cover the display unit 12. When the optical sensing unit 14 is idle, the driving unit 16 may drive the optical sensing unit 14 to move to the target position P for storage. When the optical sensing unit 14 is used to measure brightness and/or color displayed by the display unit 12, the driving unit 16 may drive the optical sensing unit 14 to move to the other side of the predetermined range R and the other side of the predetermined range R covers the display unit 12. In this embodiment, the driving unit 16 may drive the optical sensing unit 14 to move in a rotating manner, such that the predetermined range R is fan-shaped correspondingly, but is not so limited. It should be noted that the target position P may also be set at any position of the predetermined range R according to practical applications, so the invention is not limited to the embodiment shown in the figure.

When the display device 1 is powered off during the movement of the optical sensing unit 14, the optical sensing unit 14 will stop at a specific position within the predetermined range R, as shown in FIG. 3. When the display device 1 is powered on next time, the processing unit 18 controls the display unit 12 to display a predetermined pattern 20 corresponding to the predetermined range R first and the predetermined range R is also fan-shaped, wherein a region where the predetermined pattern 20 is located at is divided into a plurality of areas A1-A4 and the predetermined pattern 20 within the areas A1-A4 has different optical characteristics. The areas A1-A4 may comprise a target area A1, wherein the target area A1 is adjacent to the target position P. In other words, the target area of the invention is set according to the target position. Furthermore, the number of areas divided from the region where the predetermined pattern 20 is located at may be determined according to practical applications, so the invention is not limited to the embodiment shown in the figure. In this embodiment, the optical characteristic may comprise at least one of pattern (e.g. black and white strips), color, brightness and gray level. In other words, the areas A1-A4 may have different patterns, colors, brightness, gray levels or a combination thereof, and it depends on the type of the optical sensing unit 14.

Still further, the target area A1 corresponds to a driving parameter of the driving unit 16. In this embodiment, the driving unit 16 may be a stepper motor and the driving parameter may be a number of steps of the stepper motor. When the optical sensing unit 14 is moving from the boundary L of the target area A1 to the target position P, the number of steps performed by the stepper motor is equal to the driving parameter. The boundary L is a position of the target area A1 adjacent to other areas A2-A4. As shown in FIG. 3, opposite sides of the target area A1 are adjacent to the target position P and a non-target position NP, respectively, wherein the non-target position NP is located at the boundary L. It is assumed that the number of steps of the driving unit 16 corresponding to the target position P is 0 and the number of steps of the driving unit 16 corresponding to the non-target position NP is 500. At this time, the driving parameter of the driving unit 16 corresponding to the target area A1 may be the difference between the number of steps corresponding to the target position P and the non-target position NP (i.e. 500 steps).

As shown in FIG. 3, for example, the optical sensing unit 14 stops at the area A2 while the display device 1 is powered on. After the display unit 12 displays the predetermined pattern 20, the optical sensing unit 14 senses the optical characteristic of the area A2. Then, the processing unit 18 determines whether the optical sensing unit 14 is located within the target area A1 according to a sensing result of the optical sensing unit 14. Specifically, the optical characteristic of the predetermined pattern within the target area A1 is identical and different from the optical characteristic of the predetermined pattern within other areas A2-A4. In this embodiment, the processing unit 18 may determine whether the optical characteristic sensed by the optical sensing unit 14 is identical to the optical characteristic of the target area A1 first. When the optical characteristic sensed by the optical sensing unit 14 is identical to the optical characteristic of the target area A1, the processing unit 18 determines that the optical sensing unit 14 is located within the target area A1. On the other hand, when the optical characteristic sensed by the optical sensing unit 14 is different from the optical characteristic of the target area A1, the processing unit 18 determines that the optical sensing unit 14 is located beyond the target area A1.

As shown in FIG. 3, since the optical sensing unit 14 is located within the area A2, the optical characteristic sensed by the optical sensing unit 14 is different from the optical characteristic of the target area A1. At this time, the processing unit 18 determines that the optical sensing unit 14 is located beyond the target area A1. When the processing unit 18 determines that the optical sensing unit 14 is located beyond the target area A1, the processing unit 18 may control the driving unit 16 to drive the optical sensing unit 14 to move towards the target position P first. At the same time, the processing unit 18 keeps determining whether the optical characteristic sensed by the optical sensing unit 14 is identical to the optical characteristic of the target area A1, so as to determine whether the optical sensing unit 14 moves to a boundary L of the target area A1. When the optical characteristic sensed by the optical sensing unit 14 is identical to the optical characteristic of the target area A1, it means that the optical sensing unit 14 has moved to the boundary L of the target area A1. When the processing unit 18 determines that the optical sensing unit 14 moves to the boundary L of the target area A1, the processing unit 18 may further control the driving unit 16 to drive the optical sensing unit 14 to move to the target position P by the driving parameter (e.g. the aforesaid 500 steps) corresponding to the target area A1. Accordingly, the invention can reduce a degree of over-rotation for the driving unit 16, so as to extend the lifespan of the driving unit 16 effectively.

Similarly, when the optical sensing unit 14 stops at the area A3 or A4 and the display device 1 is powered on, the driving unit 16 may drive the optical sensing unit 14 to move to the target position P according to the aforesaid manner and that will not be depicted herein in detail again.

Figure 4:
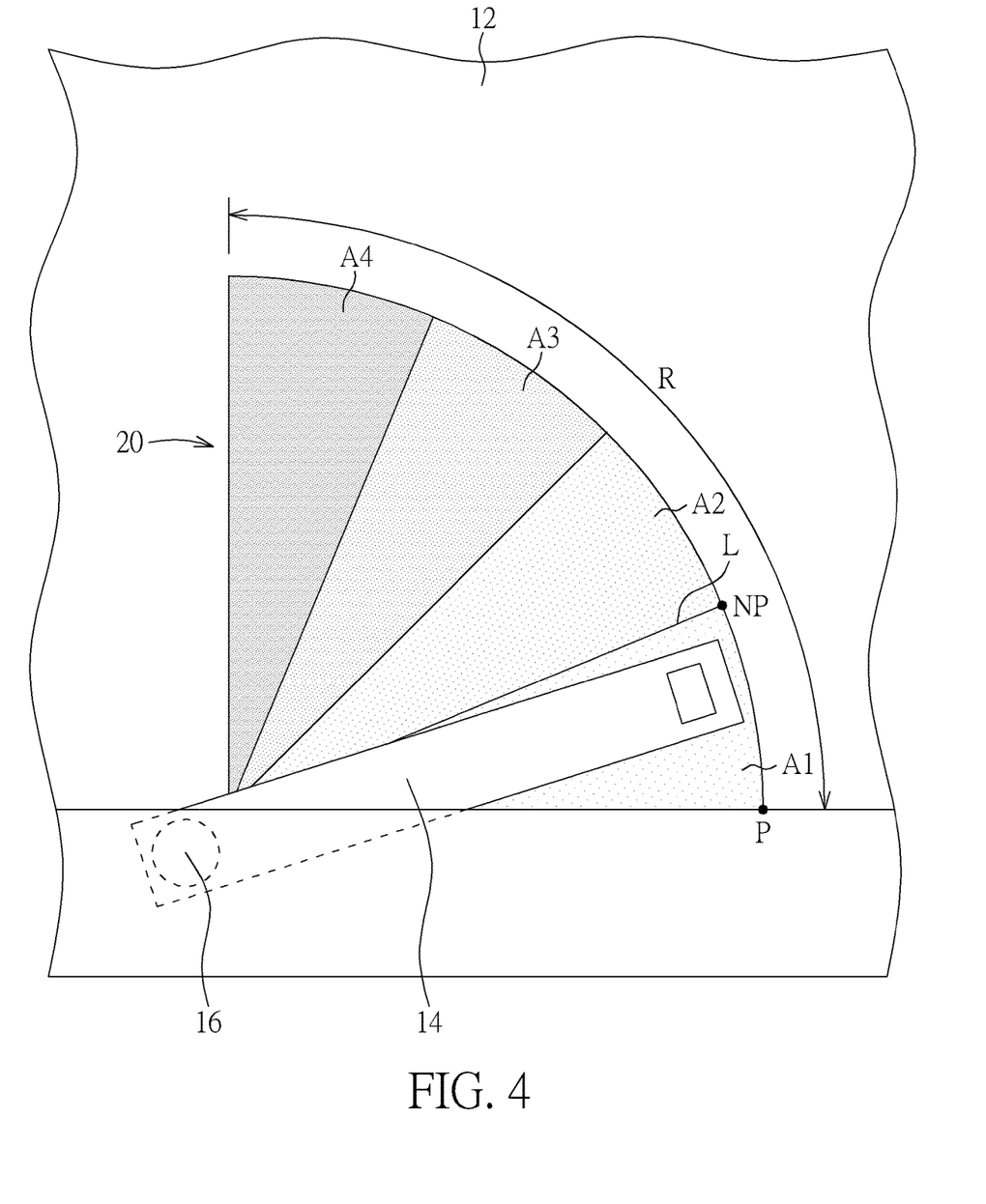
FIG. 4 is a schematic view illustrating the optical sensing unit located within the target area.

Referring to FIG. 4, FIG. 4 is a schematic view illustrating the optical sensing unit 14 located within the target area A1. As shown in FIG. 4, since the optical sensing unit 14 is located within the target area A1, the optical characteristic sensed by the optical sensing unit 14 is identical to the optical characteristic of the target area A1. At this time, the processing unit 18 determines that the optical sensing unit 14 is located within the target area A1. When the processing unit 18 determines that the optical sensing unit 14 is located within the target area A1, the processing unit 18 may control the driving unit 16 to drive the optical sensing unit 14 to move to the target position P by a predetermined manner.

In an embodiment, the aforesaid predetermined manner may be that the processing unit 18 controls the driving unit 16 to drive the optical sensing unit 14 to move in a direction towards the target position P directly by the driving parameter (e.g. the aforesaid 500 steps) corresponding to the target area A1 until the optical sensing unit 14 moves to the target position P. Since the optical sensing unit 14 has been located within the target area A1, the driving unit 16 may just over-rotate slightly after the optical sensing unit 14 moves to the target position P. Compared to the prior art, the invention can still reduce a degree of over-rotation for the driving unit 16, so as to extend the lifespan of the driving unit 16 effectively.

In another embodiment, the aforesaid predetermined manner may be that the processing unit 18 controls the driving unit 16 to drive the optical sensing unit 14 to move in a direction away from the target position P first. At the same time, the processing unit 18 keeps determining whether the optical characteristic sensed by the optical sensing unit 14 is different from the optical characteristic of the target area A1, so as to determine whether the optical sensing unit 14 moves to the boundary L of the target area A1. When the optical characteristic sensed by the optical sensing unit 14 is different from the optical characteristic of the target area A1, it means that the optical sensing unit 14 has moved to the boundary L of the target area A1. When the processing unit 18 determines that the optical sensing unit 14 moves to the boundary L of the target area A1, the processing unit 18 may further control the driving unit 16 to drive the optical sensing unit 14 to move in a direction towards the target position P by the driving parameter (e.g. the aforesaid 500 steps) corresponding to the target area A1 until the optical sensing unit 14 moves to the target position P. Accordingly, the invention can reduce a degree of over-rotation for the driving unit 16, so as to extend the lifespan of the driving unit 16 effectively.

Figure 5:
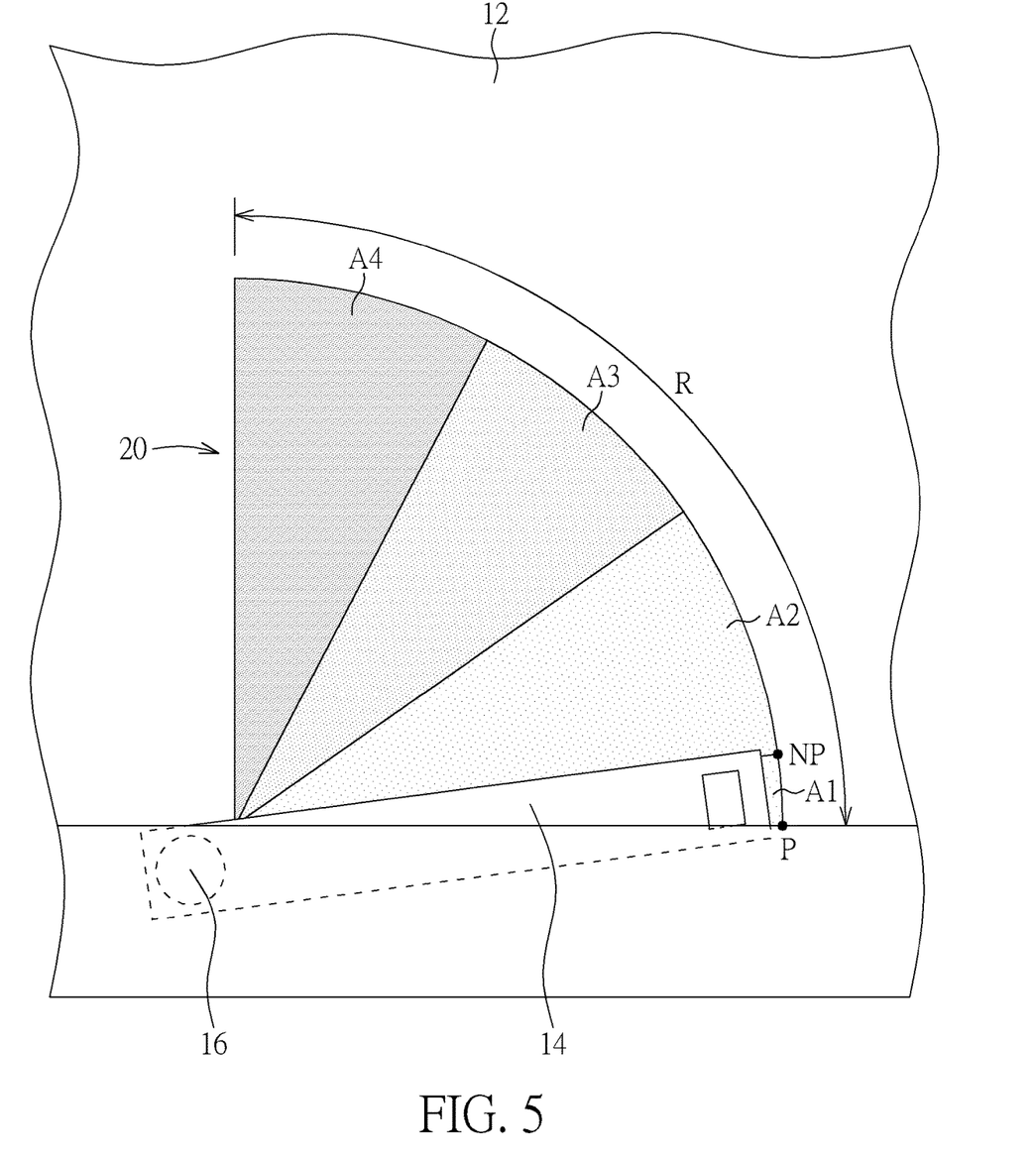
FIG. 5 is a schematic view illustrating a predetermined pattern according to another embodiment of the invention.

Referring to FIG. 5, FIG. 5 is a schematic view illustrating a predetermined pattern 20 according to another embodiment of the invention. As shown in FIG. 5, the invention may minimize a range of the target area A1 of the predetermined pattern 20. In this embodiment, the range of the target area A1 may correspond to a minimum sensing range of the optical sensing unit 14 and/or a minimum driving parameter (e.g. half step, one step, etc.) of the driving unit 16, so as to minimize the range of the target area A1. In this embodiment, it is assumed that the number of steps corresponding to the target position P is 0 and the number of steps corresponding to the non-target position NP is 10. When the optical sensing unit 14 is located within the target area A1, the processing unit 18 may control the driving unit 16 to drive the optical sensing unit 14 to move to the target position P directly by the driving parameter (e.g. the aforesaid 10 steps) corresponding to the target area A1. Since the driving parameter corresponding to the target area A1 has been minimized, the driving unit 16 may just over-rotate slightly or even does not over-rotate after the optical sensing unit 14 moves to the target position P. Accordingly, the invention can reduce a degree of over-rotation for the driving unit 16, so as to extend the lifespan of the driving unit 16 effectively.

Figure 6:
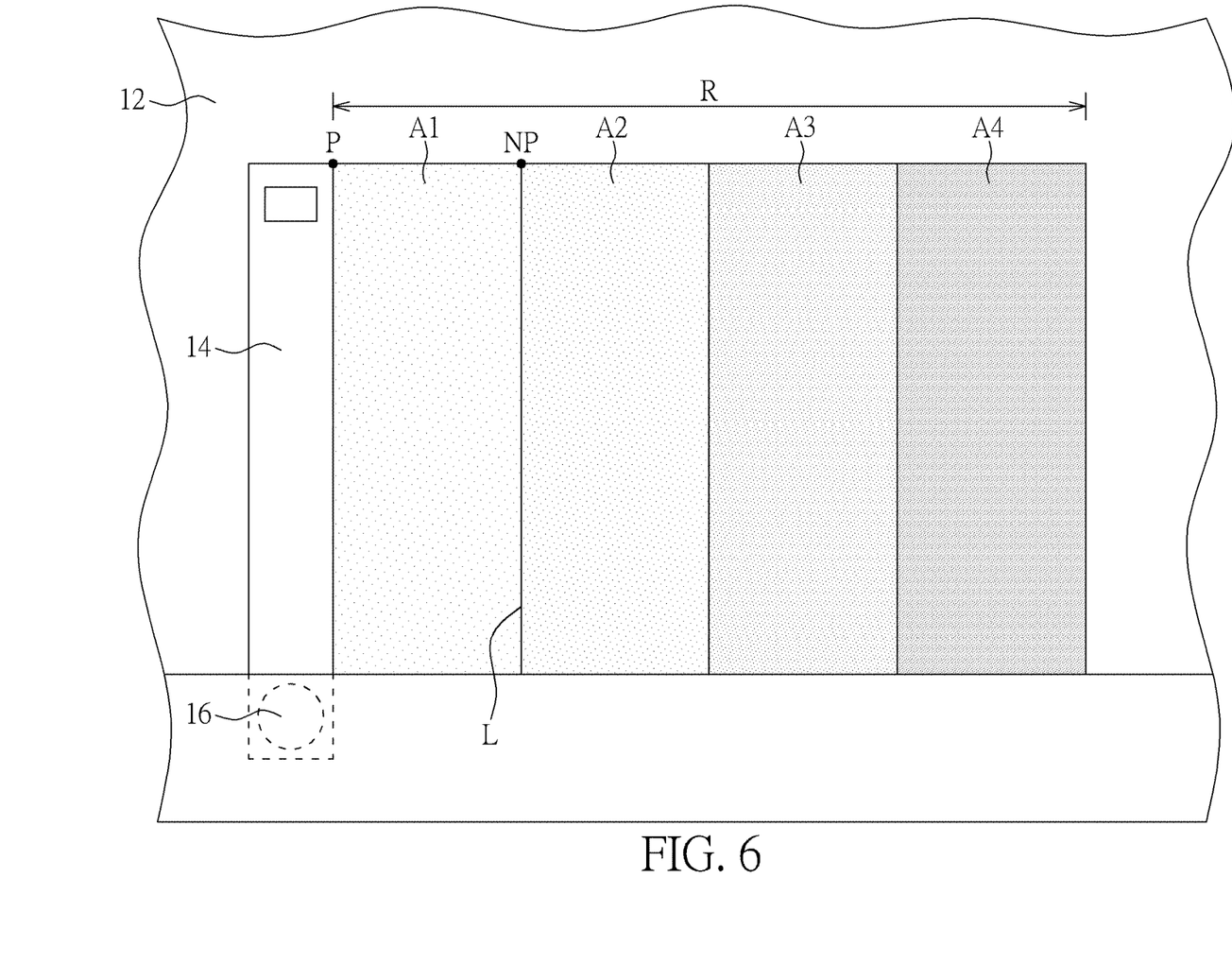
FIG. 6 is a schematic view illustrating a predetermined pattern according to another embodiment of the invention.

Referring to FIG. 6, FIG. 6 is a schematic view illustrating a predetermined pattern 20 according to another embodiment of the invention. As shown in FIG. 6, in another embodiment, the driving unit 16 may drive the optical sensing unit 14 to move linearly along a horizontal direction. Therefore, the predetermined pattern 20 may be rectangular corresponding to the movement of the optical sensing unit 14.

Figure 7:
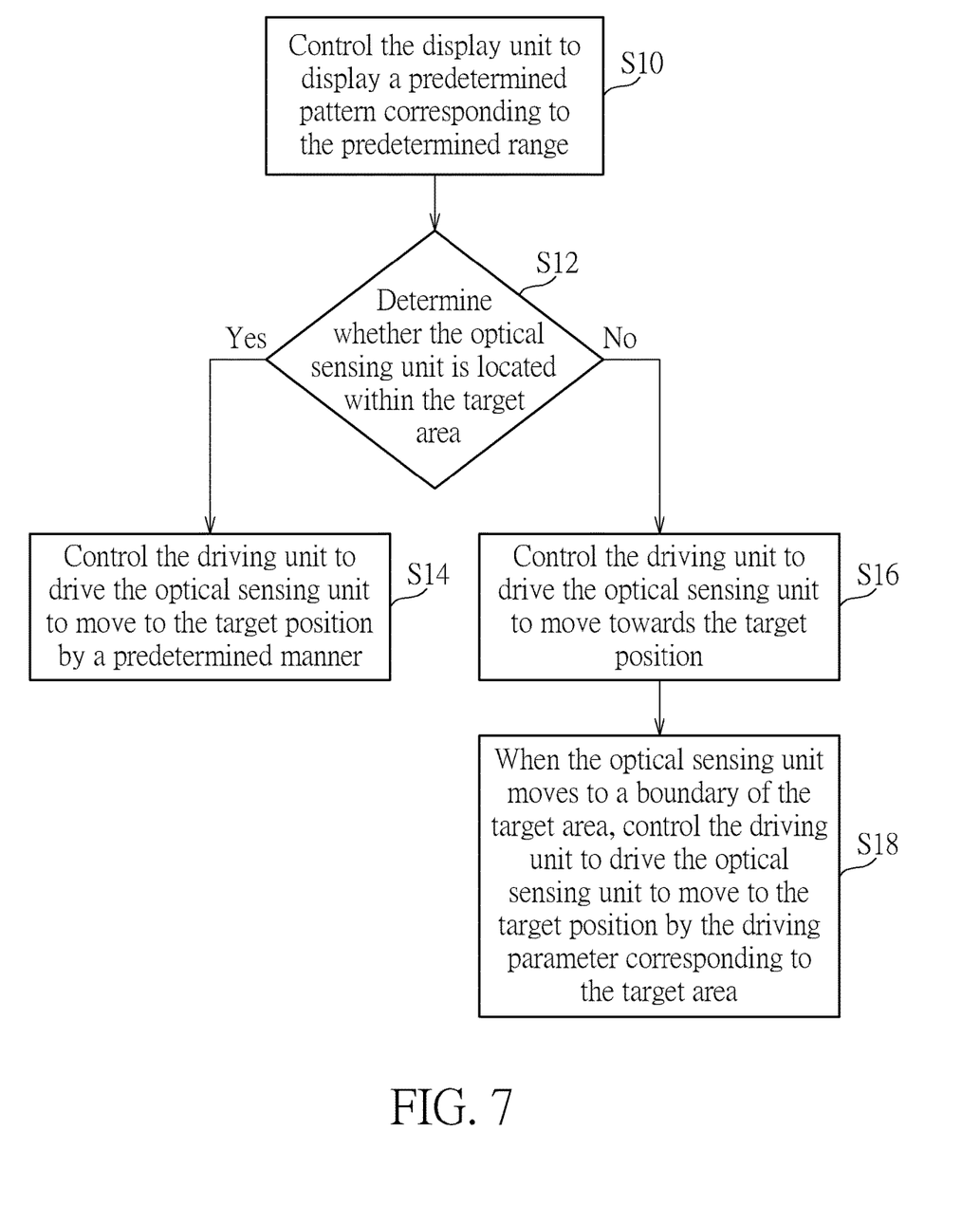
FIG. 7 is a flowchart illustrating a method for controlling an optical sensing unit according to an embodiment of the invention.

Referring to FIG. 7, FIG. 7 is a flowchart illustrating a method for controlling an optical sensing unit according to an embodiment of the invention. The method for controlling an optical sensing unit shown in FIG. 7 is adapted to the aforesaid display device 1. First, step S10 is performed to control the display unit 12 to display a predetermined pattern 20 corresponding to the predetermined range R. Then, step S12 is performed to determine whether the optical sensing unit 14 is located within the target area A1 according to a sensing result of the optical sensing unit 14. When the optical sensing unit 14 is located within the target area A1, step S14 is performed to control the driving unit 16 to drive the optical sensing unit 14 to move to the target position P by a predetermined manner. When the optical sensing unit 14 is located beyond the target area A1, step S16 is performed to control the driving unit 16 to drive the optical sensing unit 14 to move towards the target position P. Then, when the optical sensing unit 14 moves to a boundary L of the target area A1, step S18 is performed to control the driving unit 16 to drive the optical sensing unit 14 to move to the target position P by the driving parameter corresponding to the target area A1.

It should be noted that the detailed embodiments of the method for controlling the optical sensing unit of the invention are mentioned in the above and those will not be depicted herein again. Furthermore, each part or function of the control logic of the method for controlling the optical sensing unit shown in FIG. 7 may be implemented by software, hardware or the combination thereof.

As mentioned in the above, when the display device is powered on, the invention controls the display unit to display the predetermined pattern with different optical characteristics. Then, the invention determines whether the optical sensing unit is located within the target area adjacent to the target position according to the sensing result of the optical sensing unit, so as to determine how to control the driving unit to drive the optical sensing unit to move to the target position. Accordingly, the invention can reduce a degree of over-rotation for the driving unit, so as to extend the lifespan of the driving unit effectively. Furthermore, the invention does not need to install the brightness sensor of the prior art configured to sense the position of the optical sensor, such that the cost of the display device can be reduced effectively.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A display device comprising:
    a casing;
    a display unit disposed in the casing;
    an optical sensing unit movably connected to the casing;
    a driving unit connected to the optical sensing unit, the driving unit driving the optical sensing unit to move with respect to the display unit within a predetermined range; and
    a processing unit electrically connected to the display unit, the optical sensing unit and the driving unit, the processing unit controlling the display unit to display a predetermined pattern corresponding to the predetermined range, a region where the predetermined pattern is located at being divided into a plurality of areas, the predetermined pattern within the areas having different optical characteristics and the areas comprising a target area, the target area being adjacent to a target position, the target area corresponding to a driving parameter of the driving unit;
    wherein the optical sensing unit is located within one of the areas and senses the optical characteristic of the one of the areas correspondingly, the processing unit determines whether the optical sensing unit is located within the target area according to a sensing result of the optical sensing unit; when the processing unit determines that the optical sensing unit is located within the target area, the processing unit controls the driving unit to drive the optical sensing unit to move to the target position by a predetermined manner; when the processing unit determines that the optical sensing unit is located beyond the target area, the processing unit controls the driving unit to drive the optical sensing unit to move towards the target position; when the processing unit determines that the optical sensing unit moves to a boundary of the target area, the processing unit controls the driving unit to drive the optical sensing unit to move to the target position by the driving parameter corresponding to the target area.

2. The display device of claim 1, wherein the optical characteristic comprises at least one of pattern, color, brightness and gray level.

3. The display device of claim 1, wherein the driving unit is a stepper motor and the driving parameter is a number of steps of the stepper motor; when the optical sensing unit is moving from the boundary of the target area to the target position, the number of steps performed by the stepper motor is equal to the driving parameter.

4. The display device of claim 1, wherein the predetermined manner is that the processing unit controls the driving unit to drive the optical sensing unit to move in a direction towards the target position by the driving parameter corresponding to the target area until the optical sensing unit moves to the target position.

5. The display device of claim 1, wherein the predetermined manner is that the processing unit controls the driving unit to drive the optical sensing unit to move in a direction away from the target position; when the processing unit determines that the optical sensing unit moves to the boundary of the target area, the processing unit controls the driving unit to drive the optical sensing unit to move in a direction towards the target position by the driving parameter corresponding to the target area until the optical sensing unit moves to the target position.

6. The display device of claim 1, wherein a range of the target area corresponds to a minimum sensing range of the optical sensing unit and/or a minimum driving parameter of the driving unit.

7. The display device of claim 1, wherein the optical characteristic of the predetermined pattern within the target area is identical and different from the optical characteristic of the predetermined pattern within other areas.

8. A method for controlling an optical sensing unit adapted to a display device, the display device comprising a display unit, a driving unit and the optical sensing unit, the driving unit driving the optical sensing unit to move with respect to the display unit within a predetermined range, the method comprising steps of:
    controlling the display unit to display a predetermined pattern corresponding to the predetermined range, wherein a region where the predetermined pattern is located at is divided into a plurality of areas, the predetermined pattern within the areas has different optical characteristics and the areas comprise a target area, the target area is adjacent to a target position, and the target area corresponds to a driving parameter of the driving unit;
    sensing the optical characteristic of one of the areas by the optical sensing unit;
    determining whether the optical sensing unit is located within the target area according to a sensing result of the optical sensing unit;
    when the optical sensing unit is located within the target area, controlling the driving unit to drive the optical sensing unit to move to the target position by a predetermined manner;
    when the optical sensing unit is located beyond the target area, controlling the driving unit to drive the optical sensing unit to move towards the target position; and
    when the optical sensing unit moves to a boundary of the target area, controlling the driving unit to drive the optical sensing unit to move to the target position by the driving parameter corresponding to the target area.

9. The method of claim 8, wherein the optical characteristic comprises at least one of pattern, color, brightness and gray level.

10. The method of claim 8, wherein the driving unit is a stepper motor and the driving parameter is a number of steps of the stepper motor; when the optical sensing unit is moving from the boundary of the target area to the target position, the number of steps performed by the stepper motor is equal to the driving parameter.

11. The method of claim 8, wherein the predetermined manner is that the processing unit controls the driving unit to drive the optical sensing unit to move in a direction towards the target position by the driving parameter corresponding to the target area until the optical sensing unit moves to the target position.

12. The method of claim 8, wherein the predetermined manner is that the processing unit controls the driving unit to drive the optical sensing unit to move in a direction away from the target position; when the processing unit determines that the optical sensing unit moves to the boundary of the target area, the processing unit controls the driving unit to drive the optical sensing unit to move in a direction towards the target position by the driving parameter corresponding to the target area until the optical sensing unit moves to the target position.

13. The method of claim 8, wherein a range of the target area corresponds to a minimum sensing range of the optical sensing unit and/or a minimum driving parameter of the driving unit.

\* \* \* \* \*